May 17, 1960 K. KIRCHHOFF 2,936,689
CLOSE-UP ATTACHMENT FOR PHOTOGRAPHIC CAMERAS
Filed May 1, 1956 3 Sheets-Sheet 1
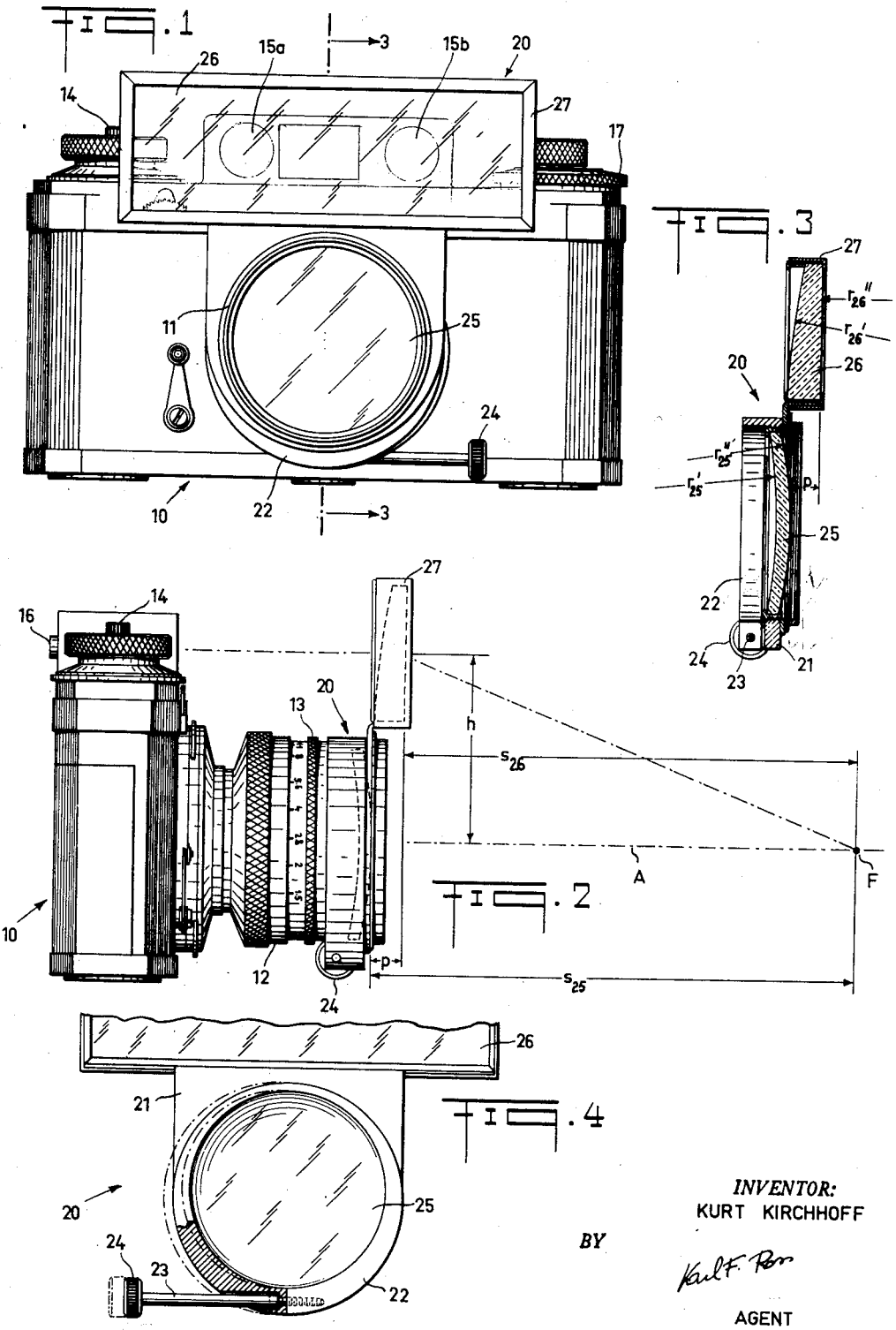
INVENTOR:
KURT KIRCHHOFF
BY
AGENT May 17, 1960 K. KIRCHHOFF 2,936,689
CLOSE-UP ATTACHMENT FOR PHOTOGRAPHIC CAMERAS
Filed May 1, 1956 3 Sheets-Sheet 2
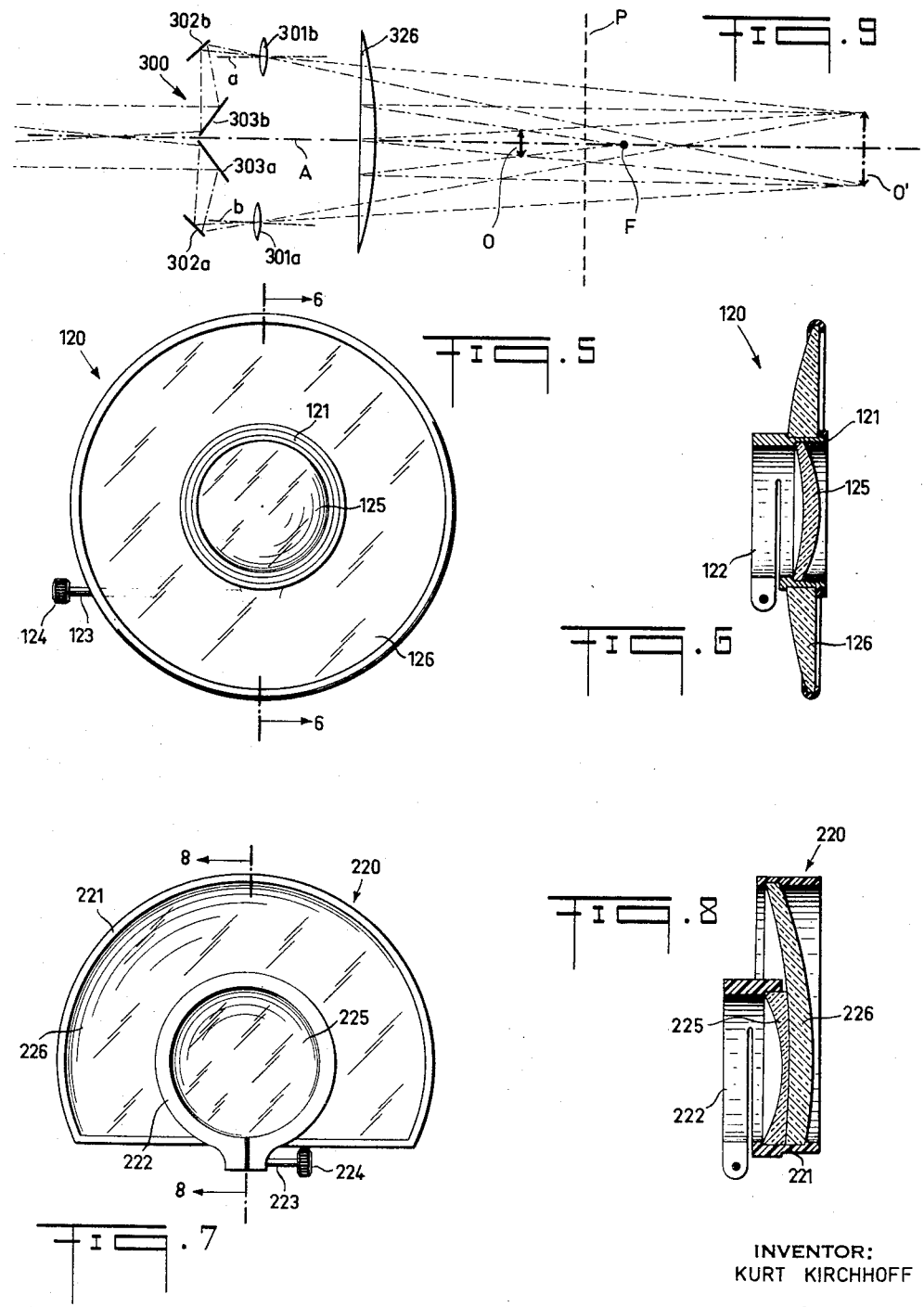
INVENTOR:
KURT KIRCHHOFF
BY
AGENT

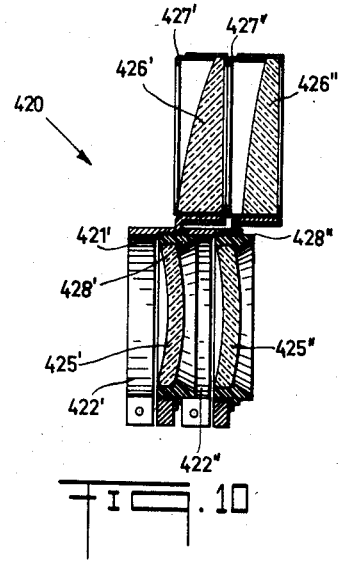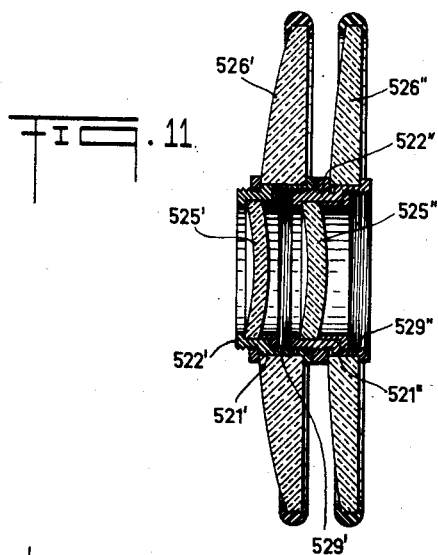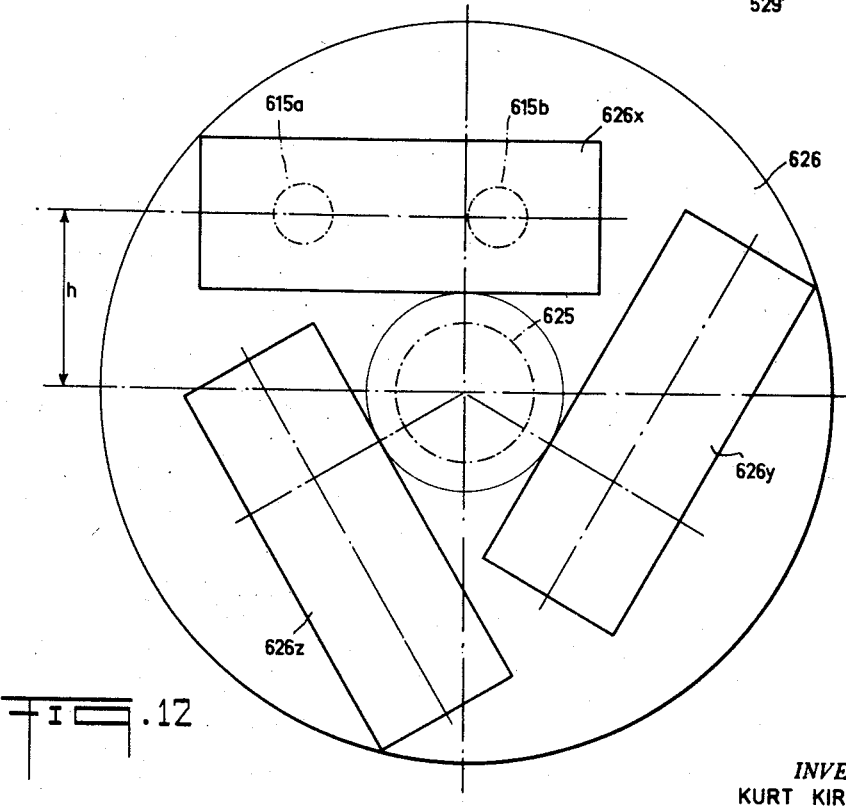

United States Patent Office 2,936,689
Patented May 17, 1960

2,936,689

CLOSE-UP ATTACHMENT FOR PHOTOGRAPHIC CAMERAS

Kurt Kirchhoff, Hamburg, Germany

Application May 1, 1956, Serial No. 581,877

Claims priority, application Germany October 11, 1950

2 Claims. (Cl. 95—44)

My present invention relates to an attachment designed to facilitate the taking of close-ups with photographic cameras wherein a pair of spaced-apart light-receiving apertures, forming part of a combination range finder and view finder, are axially offset from a main lens assembly serving for picture-taking purposes.

In cameras wherein a lens system other than the principal objective system is used for either view-finding or range-finding, parallactic errors occur because of the necessary disalignment of the optical axes of the two systems. At large distances this error is generally negligible; at close range, however, the disparity between the fields of sight of the camera objective and of the finder becomes increasingly objectionable. Even if the finder axis is inclined to intersect the objective axis, coincidence is limited to the region of intersection which becomes more and more narrowly defined as the camera is approached.

In order to avoid the effects of parallax, it has already been proposed in the case of a view finder to utilize for the latter an eccentric lens member whose axis coincides with that of the main objective. Such arrangement will not serve, however, in the case of a range finder of the conventional type having two spaced-apart apertures adapted to form a pair of images whose disalignment is a function of distance and which can be brought to coincidence by a focusing mechanism also controlling the axial displacement of one or more elements of the main lens assembly; since all sections of a given lens project (ideally) the same image, distance measurements by the aforedescribed methods could not be carried out if both finder sections consisted of segments of the same concentric lens.

The general object of my present invention is to provide an attachment for substantially eliminating or at least greatly reducing the parallactic error when taking close-ups with a camera having a range finder (which conveniently may also serve as a view finder) of the character described above.

A more particular object of this invention is to provide an attachment for the purpose described which will simultaneously serve as a means for refocusing the principal camera objective to adapt it for picture-taking at close distances.

Another more specific object of this invention is to provide an attachment of the character set forth which can be easily mounted on the front end of the camera objective and whose angular position relative to the range finder (or combination range and view finder) is not critical.

According to an important feature of the present invention, as originally disclosed in by now abondoned application Ser. No. 250,448, filed October 9, 1951 (of which the present application is a continuation-in-part), I provide a camera attachment comprising a first, centrally symmetrical lens member and a second lens member optically coaxial with the first lens member, both mounted on a common support in such manner that the second lens member extends beyond the periphery of the first one. Both lens members are positively refracting and of a focal length greater than the minimum normal operating distance to which the associated camera is adjusted in the absence of the attachment, these lens members being thus adapted to produce erect virtual images, located within the normal operating range of the camera, of objects positioned closer than said minimum distance.

Advantageously, the focal powers of the two lens members are so selected that the camera will correctly forcus at close range, under the control of the range finder, without modification of the coupling mechanism therebetween when the device is attached to it in such manner that the first lens member covers the main objective while the second lens member overlies the finder apertures. In view of the well-known undercorrection of spherical aberration by the peripheral portions of large-aperture lenses it will be desirable, by way of compensation, to reduce the focal length of the second lens member (i.e. the one overlying the combination range and view finder) to a slight extent with respect to the focal length of the first lens member (i.e. the one positioned in front of the objective). Best results are obtained if the first lens member is given the form of a positively refracting meniscus turning its concave side toward the objective and if the second lens member is a substantially plano-convex lens facing the finder apertures with its convex surface.

The mounting of the attachment on the camera may be conveniently accomplished by a clamping ring centered on its optical axis and adapted to engage the forward flange of the movable lens barrel. The second lens member referred to above preferably has an angular width substantially greater than the distance of the two finder apertures, so that precise angular positioning of the attachment on the lens holder is not necessary. Where the camera is of a type which is focusable by rotation of the front lens, this second lens member can be made to extend over all or at least a major fraction of a ring segment so that viewing will not be affected by the focusing of the objective.

The above and other objects, features and advantages of my invention will become more fully apparent from the following detailed description, reference being had to the accompanying drawing in which:

Fig. 1 is a front-elevational view of a conventional camera equipped with an attachment according to the invention;

Fig. 2 is a side-elevational view of the combination of Fig. 1;

Fig. 3 is a sectional view of the attachment of Figs. 1 and 2, taken on the line 3—3 of Fig. 1;

Fig. 4 is a fragmentary rear view of the attachment, shown partly in section to illustrate the clamping mechanism thereof;

Figs. 5 and 7 are front-elevational views of attachments representing other embodiments of the invention;

Figs. 6 and 8 are sectional views taken on the lines 6—6 and 8—8 of Figs. 5 and 7, respectively;

Fig. 9 is a diagrammatic top plan view of a range finder in combination with an attachment embodying the invention;

Figs. 10 and 11 are views similar to Figs. 3 and 6, representing further modifications; and Fig. 12 is a schematic view of a lens body utilized as a source of several lens elements for attachments embodying the invention.

In Figs. 1 and 2 I have shown a camera 10 having the attachment 20 mounted on the forward flange 11 of its lens barrel 12. Besides the usual diaphragm-control ring 13 and shutter release 14, camera 10 also has a combination range and view finder comprising entrance apertures 15a, 15b and an eye piece 16. The range finder is controlled by a knob 17 whose rotation is also translated, by mechanism known per se and not further illustrated, into an axial displacement of the lens barrel 12. Knob 17 co-operates with a suitable distance indicator, not shown, which may comprise separate scales for use with and without the attachment 20, respectively.

The device 20, details of which are also shown in Figs. 3 and 4, comprises a frame 21 provided with a split clamping ring 22 adapted to engage the flange 11; ring 22 can be tightened about this flange by means of a threaded stem 23 carrying a knob 24. A meniscus-shaped, positively refracting lens 25 is mounted on frame 21 substantially concentrically with ring 22 so as to assume a position of axial alignment with the lens holder 12 upon the fastening of device 20 on camera 10. A lens element 26, representing a fragment of a plano-convex lens coaxial with lens 25, is rigidly held in an extension 27 of frame 21 so as to be alignable with the finder apertures 15a and 15b; it will be observed that lens element 26 is wide enough to register with these apertures even if the frame 21 is displaced by a considerable angle, on either side, from the normal position shown in Fig. 1.

The attachment 120 of Figs. 5 and 6 comprises a frame 121, a resilient clamping ring 122 with stem 123 and knob 124, an inner lens 125 similar to lens 25 and arranged to face the associated camera objective with its concave side, and an annular outer lens element 126 coaxial with lens 125. This attachment can be placed on camera 10 in virtually any angular position.

Figs. 7 and 8 show an attachment 220 whose frame 221 extends over a major portion of a circle and supports a large positive lens segment 226, greater than a semicircle, in coaxial relationship with a smaller negative lens 225 of circular configuration. Lenses 225 and 226, both of which are meniscus-shaped, may be cemented together; lens 225 and the contiguous central part of lens 226 effectively form an inner lens portion, analogous to elements 125 and 25, which has a larger focal length than the surrounding annular portion of lens 226. The mounting and centering mechanism for frame 221 comprises clamping ring 222, stem 223 and knob 224.

It will be understood that the composite lens 225, 226 could also have been cut from a single piece of lens material (glass or transparent plastic, e.g. a polyacrylate) and that similarly the two lenses 125, 126 in Figs. 5 and 6 could be made integral with each other.

Reference will now be made to Fig. 9 for a description of the mode of operation of an attachment according to my invention. At A there is shown the optical axis of the main lens assembly of camera 10 (mounted in barrel 12) which coincides with the axis of lens 326; this lens is representative of any of the lenses 26, 126, 226 shown in the preceding figures. A range finder 300 includes auxiliary lenses 301a, 301b, having their axes a, b offset from the principal axis A, which are assumed to be positioned behind the finder apertures 15a, 15b of Fig. 1 and direct the incident light rays via oblique mirrors 302a, 302b and 303a, 303b toward the eye piece 16 thereof. Although the range finder 300 has been shown to be symmetrical with respect to a vertical plane passing through axis A, it may be convenient in practice, for view-finding purposes, to align the eye piece with one of the finder apertures, such as aperture 15a, and to compensate for the difference in path length by a supplemental optical system well known per se.

Let the plane P represent the proximal limit of the focusing range of lens barrel 12 and also of the range of adjustability of finder 300. The primary focal point F of lens 326 is positioned beyond this limit so that an object O to the left of plane P forms an erect virtual image O' to the right thereof. Thus, the finder now operates as though sighting an object O' within its normal operating range, rotation of the knob 17 to produce image coincidence (as viewed through eye piece 16) causing proper adjustment of the camera objective whose focal length has been correspondingly varied by the interposition of the central lens 25, 125 or 225 between itself and the object.

As illustrated in Fig. 2, the attachment 20 (or its modifications 120, 220) is also effective in the vertical plane to deflect the light rays onto a path more nearly parallel with the optical axis of the objective. As a result, the parallactic error is minimized as both viewer and camera look upon a given object from more nearly the same angle.

Figs. 2 and 3 also illustrate various parameters of the lenses 25 and 26, such as the radii $r_{25}'$, $r_{25}''$ of lens 25, the spacing $s_{25}$ of the front face of that lens from the primary focus F, the corresponding spacing $s_{26}$ for lens 26, the difference in front-focal distance $p = s_{25} - s_{26}$ representing the axial separation between these two lens faces, and the radii $r_{26}'$, $r_{26}''$ of lens 26. Typical numerical values for the above parameters and for the lens thicknesses $d_{25}$, $d_{26}$, applicable to an attachment with an operating range up to about 50 cm., are given in the following table which also shows the focal length $f_{25}$ and $f_{26}$, the refractive indices $n_d$ and the Abbé numbers $v$ of the lenses:

| | | | | |
|---|---|---|---|---|
| Lens 25 | $r_{25}' = -75.66$ mm. | $d_{25} = 3.2$ mm. | $f_{25} = 492$ mm. | $n_d = 1.52249$ |
| | $r_{25}'' = -59.31$ mm. | $p = 9$ mm. | $s_{25} = 499$ mm. | $v = 59.6$ |
| Lens 26 | $r_{26}' = +260.01$ mm. | $d_{26} = 10.55$ mm. | $f_{26} = 494$ mm. | $n_d = 1.52249$ |
| | $r_{26}'' = \infty$ | | $s_{26} = 488$ mm. | $v = 59.6$ |

From the foregoing table it will be seen that $f_{25} = f_{26}$ and $s_{25} = s_{26} + p$. Precise identity between the two focal lengths is not necessary and, in practice, a deviation of the order of 3% may be easily tolerated.

If an attachment of the dimensions given above is trained upon an object positioned at the midpoint of its focal length, thus at a distance of about 25 cm., the virtual image thereof will appear in the focal plane, or about 50 cm. away from the camera, hence in a region which assumedly falls just barely within the normal operating range of the finder and of the objective; if the object were moved out into the focal plane, its image would appear at infinity. From this it will be seen that an attachment as herein disclosed will have a theoretical operating range between $f/2$ and $f$ (where $f$ is the focal length of its lenses), a good practical range being from about $2f/3$ to $f$. Thus, the attachment described above may be used for distances between approximately 33 cm. and 50 cm., given a camera with a normal focusing range having its proximal limit in the neighborhood of 50 cm.

By using a combination of two or more air-spaced lenses in front of both the finder and the objective, it is possible to extend the overall range still further. Thus, if the normal camera range begins at one meter, or about three feet, the first half of such dual attachment will extend it down to a little more than half a meter, or less than two feet, whereas the second part in combination with the first will further extend that range down to about one third of a meter, or approximately one foot. Such a dual attachment has been illustrated in Figs. 10 and 11.

The device 420 of Fig. 10 consists of two structurally identical but optically different and complementary halves each similar to the attachment 20 of Fig. 6. The rear half of this device comprises a frame 421', a clamping ring 422', a central lens 425' and an eccentric lens 426' (optically coaxial with lens 425') held in a frame extension 427'. Frame 421' has a shoulder 428' adapted to receive a clamping ring 422" on frame 421" of the front half of the attachment which also has a shoulder 428" onto which a further unit, similar to those shown, may be clamped in cascade therewith. The lenses 425" and 426" of the front half of attachment 420 are aligned with and air-spaced from lenses 425' and 426', respectively; lens 426" is held in a frame extension 427" in contact with frame portion 427'.

The attachment 520 of Fig. 11 is similar to that of Fig. 10 but utilizes two cascade-connected units each of the type illustrated in Figs. 5 and 6. The rear unit or half has a frame 521' bearing the inner lens 525' surrounded by annular outer lens 526'; instead of having a clamping ring, frame 521' is here shown provided with an externally threaded rear flange 522' adapted to be screwed into the rotatable lens holder of the associated camera. Frame 521' is also provided with an internally threaded front flange 529' adapted to receive the rear flange 522" of frame 521" of the forward unit, the latter also having a threaded front flange 529" and serving as a support for lenses 525", 526". The lenses of each pair 525', 525" and 526', 526" are again in spaced alignment with each other. In this case, too, further units may be added to those illustrated.

Although in Fig. 1 the lens 26 has been shown symmetrically positioned with respect to the vertical axial plane of the camera objective, it may be desirable in practice to use an unsymmetrical arrangement as will be explained in connection with Fig. 12. This figure shows a lens body 626 from which three lenses 626x, 626y, 626z can be cut, having regard to the center distance $h$ which must correspond to the elevation of the finder axes above the objective axis as indicated in Fig. 2. At 625 there has been illustrated, in dot-dash lines, the position of the associated central lens relative to that of any of the three fragmentary lenses 626x, 626y, 626z.

As will be readily apparent from Fig. 12, it would not be possible to obtain three lens members from the single lens body 626 except for this asymmetrical positioning. The location of the finder apertures in relation to lens 626x has been indicated in dot-dash lines at 615a, 615b.

My invention is, of course, not limited to the specific embodiments described and illustrated but may be realized in various modifications, combinations and adaptations without departing from the spirit and scope of the appended claims.

I claim:

1. In combination, a photographic camera having an objective system and a plurality of sighting apertures forming part of a range finder and a view finder, said objective system including an axially displaceable lens holder, said apertures being aligned in a plane offset from the axis of said objective system, mechanism on said camera for adjusting said range finder and correspondingly refocusing said objective system, a centrally symmetrical, meniscus-shaped, positively refracting first lens member, a spherically refracting plano-convex second lens member, a support rigidly interconnecting said first and second lens members with their convex surfaces facing in opposite directions and with the plane face of said second lens member lying in a plane spaced from the vertex of the convex face of said first lens member by an axial distance substantially corresponding to the difference between the front-focal distances of said lens members, and mounting means detachably securing said support to said lens holder in a position in which said first and second lens members overlie said objective system and said sighting apertures, respectively, and in which the concave surface of said first lens member faces said objective system, with the optical axes of said lens members and of said objective system coinciding and with substantial coincidence of the front-focal planes of said lens members, said lens members having substantially the same focal length.

2. In combination, a photographic camera having an objective system and a plurality of sighting apertures forming part of a range finder and a view finder, said objective system including an axially displaceable lens holder, said apertures being aligned in a plane offset from the axis of said objective system, mechanism on said camera for adjusting said range finder and correspondingly refocusing said objective system, a centrally symmetrical, meniscus-shaped, positively refracting first lens member, a spherically refracting positive second lens member, a support rigidly interconnecting said first and second lens members with their forward vertices relatively offset by an axial distance substantially corresponding to the difference between the front-focal distances of said lens members, and mounting means detachably securing said support to said lens holder in a position in which said first and second lens members overlie said objective system and said sighting apertures, respectively, and in which the concave surface of said first lens member faces said objective system, with the optical axes of said lens members and of said objective system coinciding and with substantial coincidence of the front-focal planes of said lens members, said lens members having substantially the same focal length.

References Cited in the file of this patent

UNITED STATES PATENTS

| | | |
|---|---|---|
| 1,979,159 | Howser | Oct. 30, 1934 |
| 1,993,463 | Thorner | Mar. 5, 1935 |
| 2,674,932 | Tydings et al. | Apr. 13, 1954 |

FOREIGN PATENTS

| | | |
|---|---|---|
| 600,742 | Germany | Aug. 4, 1934 |
| 509,424 | Great Britain | July 14, 1939 |
| 849,485 | France | Aug. 21, 1939 |
| 967,370 | France | Mar. 29, 1950 |